May 6, 1930.  R. T. PARK  1,757,683

MOLD FOR FORMING COATED CONFECTIONS

Filed May 2, 1925

INVENTOR
Robert T. Park.
BY Clayton E. Wyrick
ATTORNEY

Patented May 6, 1930

1,757,683

UNITED STATES PATENT OFFICE

ROBERT T. PARK, OF WINDSOR, ONTARIO, CANADA

MOLD FOR FORMING COATED CONFECTIONS

Application filed May 2, 1925. Serial No. 27,406.

This invention relates to a mold for forming coated confections and has for its object the quantity production of coated confections, rapidly, economically and by the use of quite a simple apparatus.

In attaining these and various other objects the invention is carried out as illustrated by the accompanying drawings, wherein.

Figure 1:
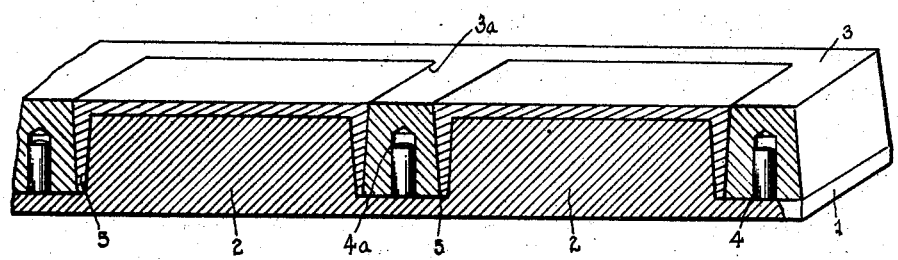
Figure 1 is a sectional view illustrating the first step in using the improved mold, consisting in forming a pan-shaped portion of the coating of the confection.

In these views, the reference character 1 designates a plate integral with which is formed a plurality of upstanding cores 2 slightly pyramidal. 3 designates a flask member of a grid form which is adapted to seat freely upon the plate 1, said member being formed with a plurality of substantially rectangular openings 3A, dowel pins 4 carried by the plate 1 are engageable with the socket 4A formed in the member 3, accurately positioning said member so as to center each core member 2 within one of the openings 3A.

In using the described mold, after the flask member 3 has been superposed on the plate 1, as above described, the material which is to form the outer coating of the confection is poured on the core members 2, entering and filling the spaces between said core members and the flask 3, so as to produce an edible member having the form of an inverted pan or dish.

Figure 2:
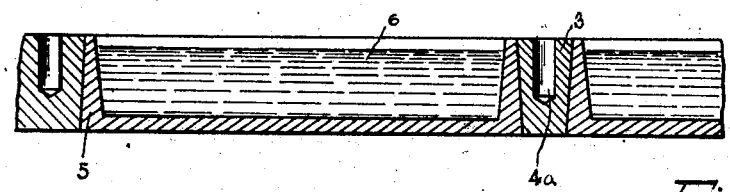
Figure 2 illustrates the second step in such use, consisting in placing the filling within the previously formed coating member.
Figure 3:
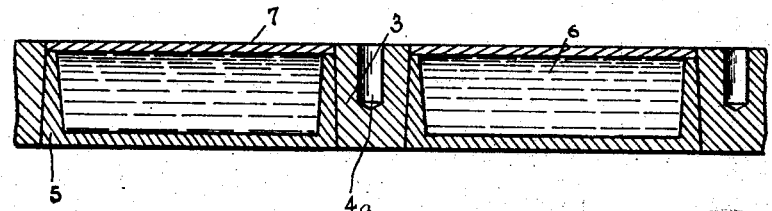
Figure 3 illustrates the third step in which the top of the outer casing is formed.

When the members 5 have sufficiently hardened, the flask member together with the members 5 is lifted clear of the core 2, is reversed top for bottom and is then set down as disclosed in Figure 2. Into each edible receptacle 5, there is now poured the filling material 6, such as ice cream, fondant, crushed fruit or the like, the receptacle 5 being filled to a level slightly below the top edges.

Finally a covering layer 7 of the coating material is poured upon the filling. This material is preferably chocolate or some similar material which will when heated assume a fluid form but which will harden when allowed to cool.

Figure 4:
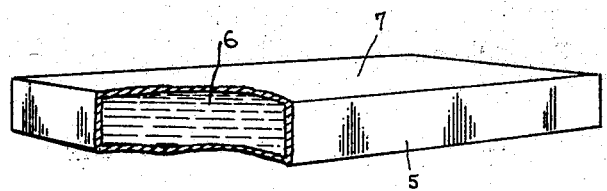
Figure 4 shows the finished product, a portion thereof being broken away to show the interior.

The heat of the surfacing layer 7 will tend to soften the edges of the originally formed receptacle 5, so that said layer will become substantially integrated with said receptacle forming the closed piece which Figure 4 illustrates.

The described mold may be used as described without the necessity of skill or training and the resulting confection in combining the soft filling with the relatively hard outer coating, is susceptible to numerous highly appetizing combinations.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

Having thus described my invention, I claim:

A mold for forming confections comprising a core plate having a plurality of core members upstanding thereupon, a flask plate adapted to be mounted upon said core plate, and formed with openings proportioned to receive said core members, and to form a mold space surrounding said core members when the latter are centered in said openings, the core members having pyramidally inclined walls, and said openings having reversely inclined walls, and pins upstanding from said core plate between the core members thereof, said flask plate being formed with sockets engageable by said pins for accurately positioning the flask plate with respect to said core plate.

In witness whereof I hereunto set my hand.

ROBERT T. PARK.